United States Patent
Man et al.

(10) Patent No.: US 8,100,812 B2
(45) Date of Patent: Jan. 24, 2012

(54) PROCESS FOR CONTROLLING A FRICTION CLUTCH

(75) Inventors: Laszlo Man, Ottersweier-Unzhurst (DE); Alexander Dreher, Sinzheim (DE); Dirk Burkhart, Klingenmuenster (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 476 days.

(21) Appl. No.: 12/384,408

(22) Filed: Apr. 3, 2009

(65) Prior Publication Data

US 2009/0258757 A1   Oct. 15, 2009

(30) Foreign Application Priority Data

Apr. 7, 2008 (DE) .......................... 10 2008 017 563

(51) Int. Cl.
  *B60K 23/00*  (2006.01)
  *F16D 13/54*  (2006.01)
  *F16D 13/75*  (2006.01)

(52) U.S. Cl. ............... 477/167; 192/70.252; 192/111.12

(58) Field of Classification Search ................... 477/167
See application file for complete search history.

(56) References Cited

U.S. PATENT DOCUMENTS

| | | | |
|---|---|---|---|
| 5,029,678 A * | 7/1991 | Koshizawa | 192/76 |
| 5,847,272 A * | 12/1998 | Schneider et al. | 73/115.02 |
| 7,419,456 B2 * | 9/2008 | Knoblauch et al. | 477/174 |
| 7,588,133 B2 * | 9/2009 | Ronk et al. | 192/85.56 |
| 2007/0199790 A1 * | 8/2007 | Whitmer et al. | 192/70.252 |

* cited by examiner

*Primary Examiner* — Dirk Wright

(74) *Attorney, Agent, or Firm* — Davidson, Davidson & Kappel, LLC

(57) ABSTRACT

The invention relates to a process for controlling an automated friction clutch with a wear adjustment device that adjusts extended clutch stroke by a discrete magnitude through the wear of friction lining at maximum transmittable torque of the friction clutch. To guarantee safe self-adjustment, also during a long operation period under the maximum clutch torque, under specified preconditions, for instance, during the start of the internal combustion engine and without gear engagement, the friction clutch is closed for maximum clutch torque.

4 Claims, 1 Drawing Sheet

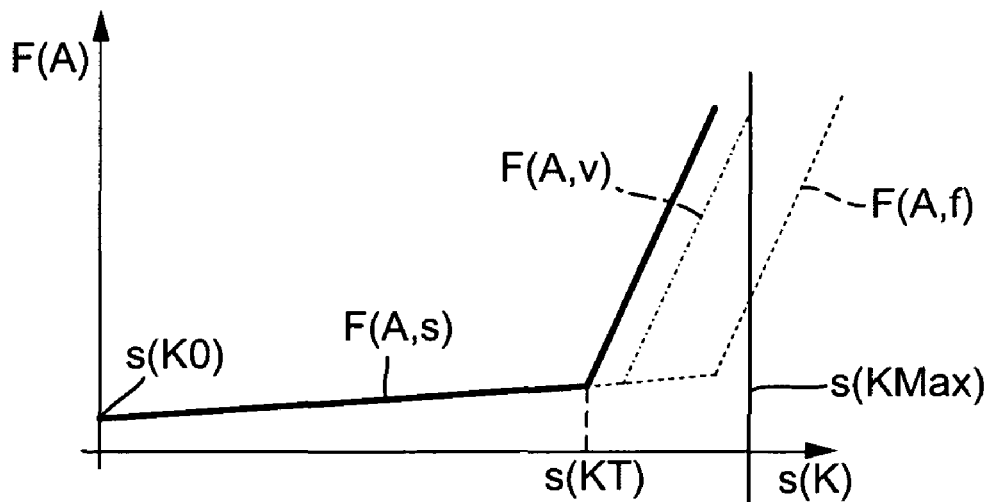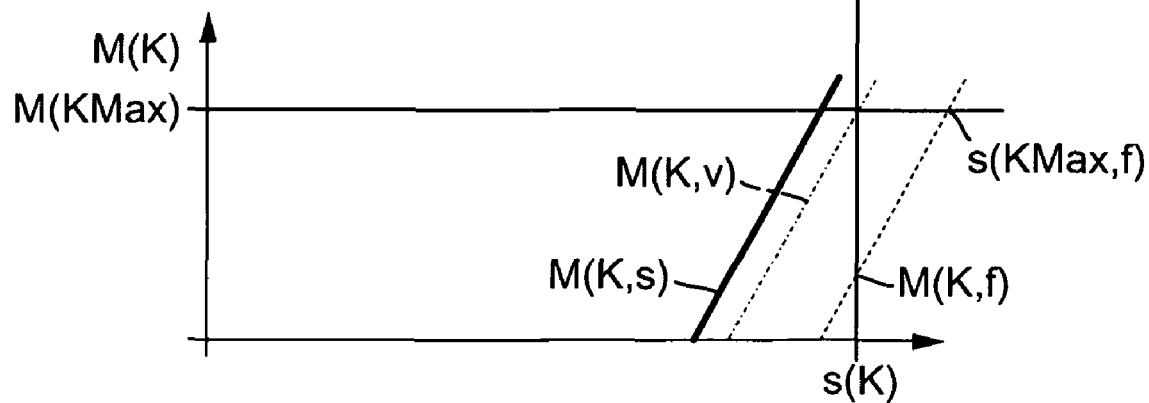

PROCESS FOR CONTROLLING A FRICTION CLUTCH

This claims the benefit of German Patent Application No. 10 2008 017 563.3 filed Apr. 7, 2008 and hereby incorporated by reference herein.

The present invention relates to a process for controlling an automated friction clutch with a stroke-sensitive wear adjustment device.

BACKGROUND

Automated friction clutches with wear adjustment devices and their control are known. Stroke-sensitive wear adjustments find application in the so-called closed friction clutches that are open in a resting position and closed under pressure, for instance, by a lever actuator, up to an extreme position at which maximally transmittable torque is achieved through the friction clutch. At the same time, the lever must be pressurized with an increasing actuator force to obtain increasing transmittable torque magnitudes so that the friction lining of the clutch disc are pressed with an increasing force. Owing to wear of the friction clutch lining or of the clutch disc pressurized by the pressure plates of the friction clutch, the clutch stroke increases, thus the travel between a resting position and an extreme position will be increased. The wear adjustment device of such friction clutches is designed so that self-adjustment occurs at a discrete distance from the compensation amount of the decreasing axial thickness of the friction lining, when the actuator pressurizes the lever, for instance a diaphragm spring or lever spring, with a force that locks the friction clutch and thus requires an actuator force that corresponds to the transmitted maximum clutch torque. Actuator forces are regulated in the process, based on the torque of the internal combustion engine required by the driver due to his driving style. If, for instance, only small engine torque is required, the actuator force, particularly due to energetic and wear reasons, will be set such that the torque at disposal from the internal combustion engine is transmitted without impermissible slip.

In case a vehicle is operated for a very long duration, for instance, with such an automated friction clutch, beyond a period of necessary self-adjustment, by the wear adjustment device, whilst shunning a requirement for maximum transmittable clutch torque then the friction lining can wear out without the friction clutch performing self-adjustment at the extreme position with maximum transmittable clutch torque. The consequence is that, owing to the increase of clutch stroke due to the uncompensated friction lining wear, the extreme position—also defined by an actuator limit stop—no longer transmits the maximum transmittable clutch torque.

SUMMARY OF THE INVENTION

One object of the invention is an embodiment of a control process that does not permit an increase of the clutch stroke beyond a self-adjustment range.

The present invention provides a process for controlling a friction clutch, with a clutch stroke acting between a resting position in an open friction clutch and an extreme position at maximum transmittable clutch torque, between an internal combustion engine and a transmission with several transmission ratios and self-adjustment of wear triggered at an extended clutch stroke at maximum transmittable clutch torque, at discrete intervals, wherein, at predetermined time intervals, the friction clutch will be actuated up to an extreme position at maximum transmittable clutch torque. The extreme position can be approached by an actuator, for instance a lever actuator, wherein the latter can feature a limit stop confining the extreme position. Alternatively or additionally, an actuator force or a variable that correlates with it, like the actuator torque, can be used for evaluating the extreme position; for an electrically powered actuator, it can be an electric variable like actuator current and/or voltage. In doing so, activation of the actuator can be aborted prior to reaching the extreme position if a predetermined actuator force is exceeded.

The process can be implemented advantageously, for instance depending on a number of clutch actuations, or total torque transmitted via the friction clutch, for instance, integrated via the operating period, or the operating period of the vehicle, or the likes where such a friction clutch is installed.

The process will then be implemented advantageously when no danger can arise from the closure of friction clutch. For instance, the friction clutch can be utilized in a stationary internal combustion engine and/or in a disengaged transmission gear.

The friction clutch can be utilized in a particularly advantageous manner in a twin clutch transmission. For this purpose, two friction clutches can be combined in one housing to form a twin clutch.

BRIEF DESCRIPTION OF THE DRAWINGS

The invention is illustrated in detail based on a single FIGURE.

DETAILED DESCRIPTION

The FIGURE shows a two-part schematically depicted diagram of the actuator force F(A) (top diagram) and the clutch torque M(K), transmittable via the friction clutch, dependent upon the engagement stroke s(K). Thereby, the perpendicular designates the engagement stroke maximally adjustable by the actuator, both the extreme position s(KMax) and the horizontal designate the maximally transmittable clutch torque M(KMax)—through the clutch. The continuous line of the stroke-dependent actuator force F(A, s) shows the actuator force F(A) in a new state or a new state compensated by means of the wear adjustment device. Starting from the resting position s(K0) the actuator is moved, with a slightly increasing actuator force, up to the contact point s(KT) of the friction clutch. By pressurizing the pressure plates, the actuator force F(A) increases, and thus the stroke-dependent clutch torque M(K, s) for attaining the maximum clutch torque M(KMax), before the extreme position s(KMax) is reached. The dashed lines for actuator force F(A, v) and clutch torque M(K, v) show the behavior of a friction clutch with wear prior to self-adjustment. Here, maximum clutch torque M(KMax) corresponds to the extreme position s(KMax).

In case a vehicle is operated beyond the duration necessary for self-adjustment, only with clutch torque that is smaller than the maximum clutch torque M(KMax), self-adjustment will not occur because the switching point of wear adjustment, at maximum clutch torque, will not have been reached. As a result, the point s(KMax, f) at which the maximum clutch torque M(Kmax) is attained wanders beyond the extreme position s(KMax) adjustable via the actuator, along the dashed line of the actuator force F(A, f), which results in only one clutch torque M(K, f) being able to be transmitted via the friction clutch, until the next time that the maximum clutch torque M(KMax) is required and the friction clutch is adjusted by the wear adjustment device. Owing to discrete self-adjustment of the wear adjustment device, a multiple approach to the switching point of the wear adjustment device can become necessary.

To prevent such delayed self-adjustment, the friction clutch is automated and activated, by a control device, at prescribed intervals in a stationary internal combustion engine and/or it is activated up to the maximum stroke s(KMax) position in a disengaged-gear transmission. In the process, the actuator force F(A) can be limited so that, in the case of behavior according to the actuator force F(A, s), the process is aborted for positions smaller than the extreme position s(KMax).

What we claim is:

1. A method for controlling a friction clutch, with a clutch stroke acting between a resting position in an open friction clutch and an extreme position at a maximum transmittable clutch torque, between an internal combustion engine and a transmission with several transmission ratios and self-adjustment of wear triggered at an extended clutch stroke at maximum transmittable clutch torque at discrete intervals, the method comprising: at predetermined time intervals, actuating the friction clutch up to an extreme position at the maximum transmittable clutch torque.

2. The method according to claim 1, wherein said method is carried out before the internal combustion engine is started.

3. The method according to claim 1, wherein an actuator activates the friction clutch up to an extreme position.

4. The method according to claim 3, wherein actuator activation is aborted before the extreme position is reached if the predetermined actuating force is exceeded.

* * * * *